(12) United States Patent
Griffin (10) Patent No.: US 8,259,071 B2
(45) Date of Patent: *Sep. 4, 2012

(54) HANDHELD ELECTRONIC DEVICE PROVIDING FEEDBACK TO FACILITATE NAVIGATION AND THE ENTRY OF INFORMATION, AND ASSOCIATED METHOD

(75) Inventor: Jason T. Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 49 days.

This patent is subject to a terminal disclaimer.

(21) Appl. No.: 12/868,923

(22) Filed: Aug. 26, 2010

(65) Prior Publication Data

US 2010/0315344 A1 Dec. 16, 2010

Related U.S. Application Data

(63) Continuation of application No. 11/053,766, filed on Feb. 9, 2005, now Pat. No. 7,808,486.

(51) Int. Cl.
*G06F 3/02* (2006.01)
*G09G 5/00* (2006.01)
(52) U.S. Cl. .................................. 345/168
(58) Field of Classification Search .......... 341/27; 345/156, 168–172
See application file for complete search history.

(56) References Cited

U.S. PATENT DOCUMENTS

| | | | |
|---|---|---|---|
| 4,700,377 A | 10/1987 | Yasuda et al. |
| 5,252,971 A | 10/1993 | Franz et al. |
| 5,270,710 A | 12/1993 | Gaultier et al. |
| 5,311,175 A | 5/1994 | Waldman |
| 5,408,060 A | 4/1995 | Muurinen |
| 5,675,329 A | 10/1997 | Barker et al. |
| 5,923,267 A | 7/1999 | Beuk et al. |
| 6,122,530 A | 9/2000 | Overy et al. |
| 6,303,887 B1 | 10/2001 | Ando |
| 6,477,390 B1 | 11/2002 | Gum et al. |
| 6,489,950 B1 | 12/2002 | Griffin et al. |

(Continued)

FOREIGN PATENT DOCUMENTS

| | | |
|---|---|---|
| EP | 0984348 | 3/2000 |
| EP | 1414053 | 4/2004 |

OTHER PUBLICATIONS

"Keyboard With Voice Output", National Aeronautics and Space Administration, Nasa Tech Brief, Lyndon B. Johnson Space Center, Houston Texas Mar. 1, 1986.

*Primary Examiner* — Bipin Shalwala
*Assistant Examiner* — Steven Holton
(74) *Attorney, Agent, or Firm* — Ridout & Maybee LLP (57) ABSTRACT

A method of facilitating the input of information in a handheld electronic device having a plurality of input elements such as, without limitation, keys. The method includes receiving a signal indicating that a particular one of the input elements is being touched in a first manner, providing a feedback signal, such as a sound or graphic, that identifies the particular input element after the signal is received, and performing a function associated with the particular input element when it is being touched in a second manner. Also, a handheld electronic device that includes an input apparatus having a plurality of input elements, a processor, and a memory in electronic communication with the processor. The memory stores one or more routines executable by the processor for implementing the method described above.

16 Claims, 4 Drawing Sheets

U.S. PATENT DOCUMENTS

| | | |
|---|---|---|
| 7,057,521 B1 | 6/2006 | Beuk et al. |
| 7,060,924 B1 | 6/2006 | Beene et al. |
| 7,083,342 B2 | 8/2006 | Griffin |
| 2001/0038382 A1 | 11/2001 | Griffin et al. |
| 2002/0057259 A1* | 5/2002 | Suzuki .......................... 345/168 |
| 2005/0122714 A1 | 6/2005 | Matthews et al. |

* cited by examiner

HANDHELD ELECTRONIC DEVICE PROVIDING FEEDBACK TO FACILITATE NAVIGATION AND THE ENTRY OF INFORMATION, AND ASSOCIATED METHOD

The present application is a continuation of U.S. patent application Ser. No. 11/053,766 filed on Feb. 9, 2005, which is incorporated herein by reference.

BACKGROUND OF THE INVENTION

1. Field of the Invention

The invention relates generally to handheld electronic devices and, more particularly, to a handheld electronic device having a system for providing feedback to a user to facilitate navigation and information entry. The invention also relates to a method of facilitating navigation and information entry on a handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability although many such handheld electronic devices are stand-alone devices that are functional without communication with other devices.

Handheld electronic devices that provide cellular telephone capabilities often are used in automobiles, frequently while the user is driving the automobile. A user typically must take his eyes off the road to perform a telephone dialing operation on the keyboard of the handheld electronic device, which is undesirable, even if it happens only momentarily. Handheld electronic devices are also used when walking and doing other activities, and a user typically must look at the device to perform various input operations, such as telephone dialing or navigation, which is likewise undesirable. Furthermore, handheld electronic devices can be difficult for visually impaired individuals to use, particularly those devices that include an unconventional keyboard, such as a reduced QWERTY keyboard. Thus, there is a need to provide a handheld electronic device that facilities the performance of input operations in situations where it is undesirable or impossible for the user to look at the device.

SUMMARY OF THE INVENTION

These and other advantages are provided by a method of facilitating the input of information in a handheld electronic device having a plurality of input elements such as, without limitation, keys. The method includes receiving a signal indicating that a particular one of the input elements is being touched in a first manner, providing a feedback signal that identifies the particular input element after the signal is received, and performing a function associated with the particular input element when it is being touched in a second manner.

In one particular embodiment, the providing step comprises providing the feedback in the form of an audible sound that identifies the particular input element. The audible sound may comprise one or more spoken words of a digit, a symbol, or a function name associated with the input element. In the case of this embodiment, the providing step may further include accessing a particular stored sound tag representative of the audible sound and generating the audible sound using the particular stored sound tag. In addition, a plurality of stored sound tags may correspond to the particular one of the input elements, wherein the particular stored sound tag that is used is one of the plurality of stored sound tags chosen based upon a current state of the handheld electronic device, such as the application currently being used. Alternatively, the providing step may comprise displaying a graphic, such as an enlarged graphic, on a display of the handheld electronic device that identifies the particular input element.

According to the method, the first manner of touching may comprise touching the particular one of the input elements with a first pressure and the second manner of touching may comprise touching the particular one of the input elements with a second pressure that is greater than the first pressure.

The invention also relates to a handheld electronic device that includes an input apparatus having a plurality of input elements such as keys, a processor, and a memory in electronic communication with the processor. The memory stores one or more routines executable by the processor for implementing the various embodiments of the method described above.

In one embodiment, the particular input element is a key forming a part of a key assembly. The key assembly has a sensor system that is in electronic communication with the processor. The sensor system generates and communicates to the processor the key indicating signal when the key is touched in the first manner. The sensor system may include a strain gauge wherein the key indicating signal comprises a voltage signal generated by the strain gauge in response to a first pressure exerted on the strain gauge by the key. In addition, the sensor system may further include a collapsible dome, with the strain gauge being located between the key and the collapsible dome. The collapsible dome is fully collapsed in response to at least a second pressure, greater then the first pressure, being exerted on the collapsible dome by the key, wherein the function associated with the key is performed when the collapsible dome is fully collapsed. Alternatively, the sensor system may include a double action switch, with the key indicating signal being generated in response to a first pressure exerted on the double action switch by the key, and the function associated with the key being performed when at least a second pressure, greater than the first pressure, is exerted on the double action switch by the key.

According to a first broad aspect of the present disclosure, there is disclosed a method of facilitating the input of information in a handheld electronic device having a plurality of input elements, comprising: receiving a signal indicating that a particular one of said input elements is being touched in a first manner; providing a feedback signal that identifies a character or symbol of said particular one of said input elements after said signal is received, said feedback signal being chosen based on an operating state of the handheld electronic device; and performing a function associated with said particular one of said input elements when said particular one of said input elements is being touched in a second manner, said function being determined based on the operating state of the handheld electronic device.

According to a second broad aspect of the present disclosure, there is disclosed a handheld electronic device, comprising: an input apparatus having a plurality of input elements; a processor; and a memory in electronic communication with said processor, said memory storing one or more routines executable by said processor, said one or more routines being adapted to: receive a signal indicating that a particular one of said input elements is being touched in a first manner; provide a feedback signal that identifies a character or symbol of said particular one of said input elements after said signal is received, said feedback signal being chosen based on an operating state of the handheld electronic device; and perform a function associated with said particular one of said input elements when said particular one of said input elements is being touched in a second manner, said function being determined based on the operating state of the handheld electronic device.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENTS

Figure 1:
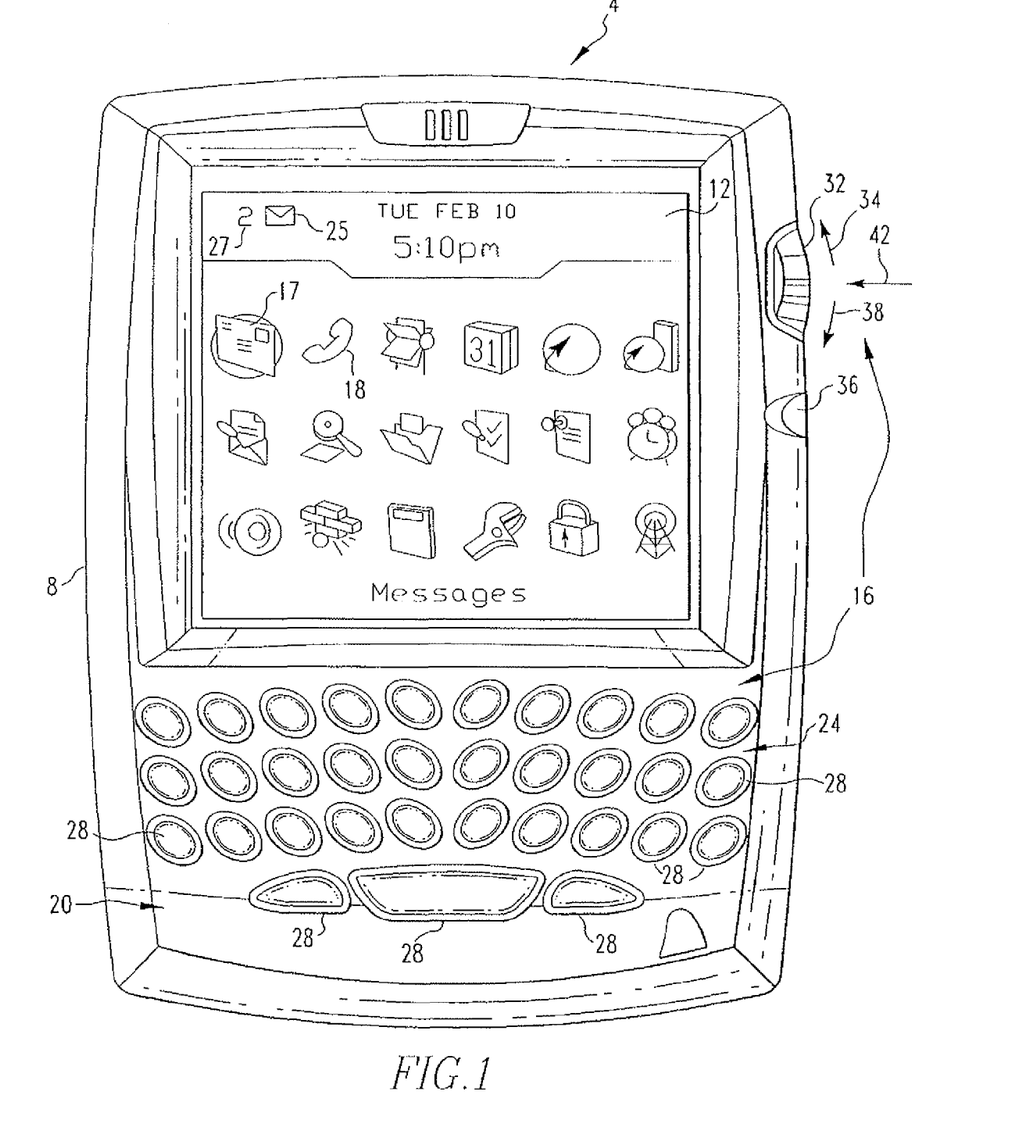
FIG. 1 is a top plan view of an improved handheld electronic device in accordance with the invention.
Figure 2:
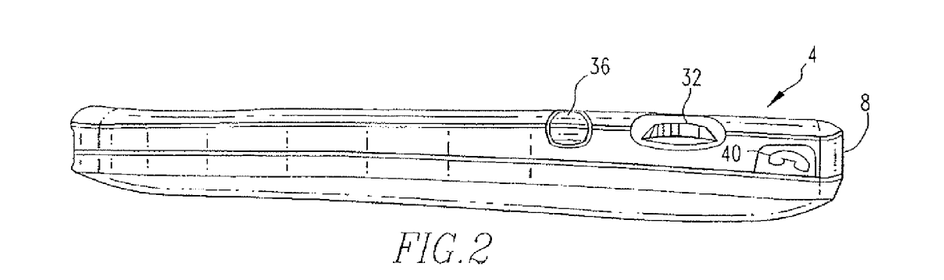
FIG. 2 is a side view of the handheld electronic device of FIG. 1.
Figure 3:
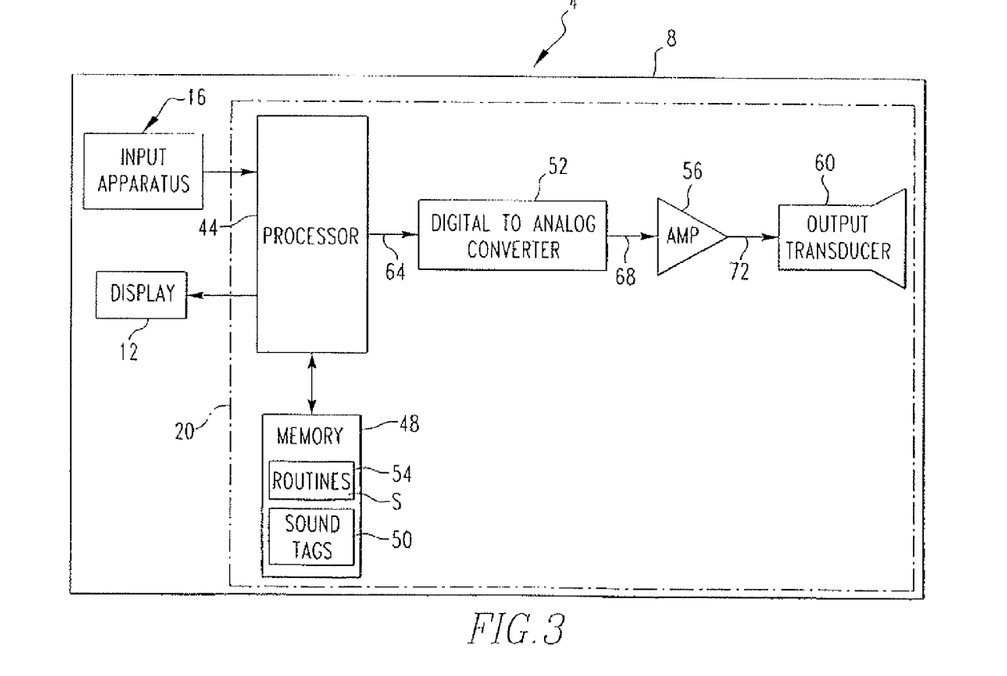
FIG. 3 is a block diagram of the handheld electronic device of FIG. 1.

An improved handheld electronic device 4 in accordance with the invention is indicated generally in FIGS. 1-3. Examples of handheld electronic devices are included in U.S. Pat. Nos. 6,452,588 and 6,489,950 which are incorporated by reference herein. The handheld electronic device 4 includes a housing 8, a display 12, an input apparatus 16, and a processor apparatus 20.

The exemplary input apparatus 16 includes a keyboard 24 having a plurality of keys 28, a thumbwheel 32, an <ESCAPE> key 36, and a telephone key 40 (FIG. 2). The thumbwheel 32 is rotatable to provide a plurality of navigational inputs to the processor apparatus 20. The thumbwheel 32 also is translatable in the direction of the arrow 42 of FIG. 1 to provide a selecting input to the processor apparatus 20. The keyboard 24 includes a number of key assemblies 80 described in greater detail below in connection with FIGS. 4 and 5.

The processor apparatus 20 includes a processor 44, a memory 48, a digital-to-analog converter 52, an amplifier 56, and an audible output transducer 60. The processor 44 may be, for example and without limitation, a microprocessor (μP) or other type of processor. The memory 48 is adapted to cooperate with the processor 44 and may be any of a variety of internal an/or external storage media including RAM, ROM, EPROM, EEPROM, and/or the like, alone or in combination. The memory 48 stores a plurality of sound tags 50 and one or more routines 54 executable by processor 44 for the processing of data. The routines can be in any of a variety of forms such as, without limitation, software, firmware, and the like, and shall include one or more subroutines, processes, procedures, function calls or the like, alone or in combination. The sound tags 50 are representative of spoken words of digits, symbols, and/or function names that are associated with the keys 28 of keyboard 24. The sound tags 50 may be stored in the memory 48 as .wav files or in other suitable formats, and may be representative of spoken words in the English language or other languages. Memory 48 stores a number of sound tags 50, each of which corresponds to a particular key 28 on keyboard 24. As explained in greater detail below, the sounds tags 50 may, according to the invention, be used to generate feedback to a user of handheld electronic device 4 that indicates which key 28 is currently being touched.

Figure 4:
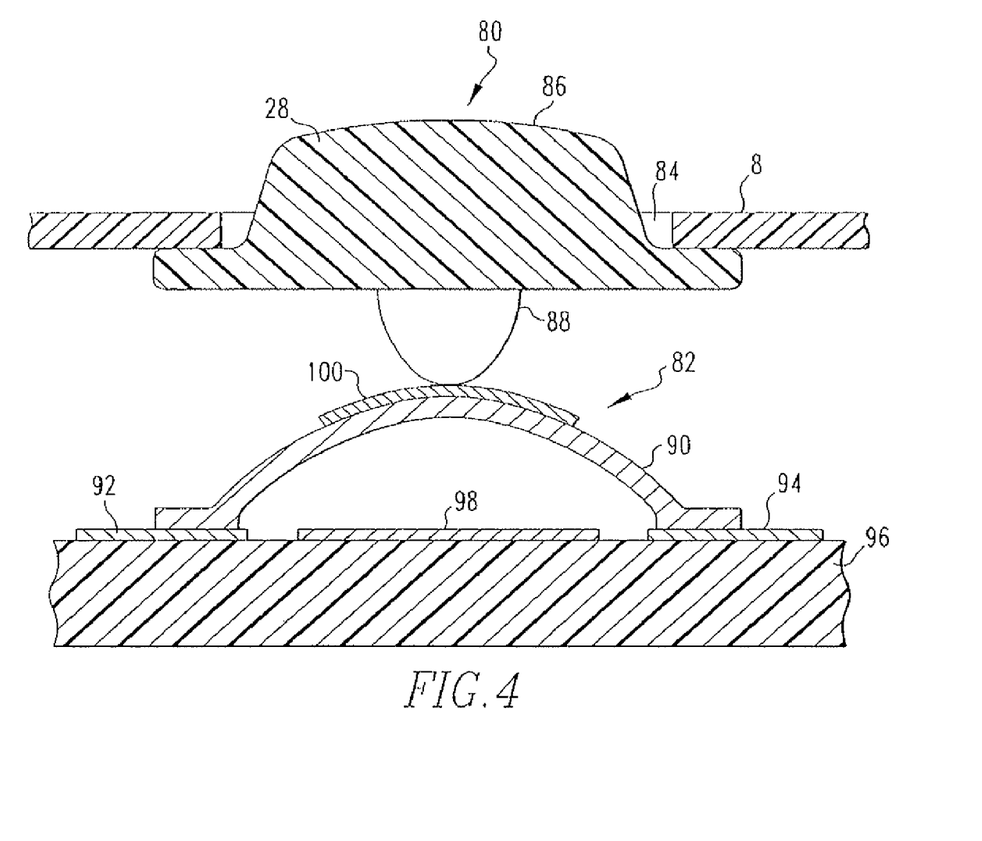
FIG. 4 is a schematic diagram of a first embodiment of a key assembly forming a part of the handheld electronic device shown in FIGS. 1-3.

Each of a number of, and preferably all of, keys 28 of keyboard 24 is part of a key assembly 80, one embodiment of which is shown schematically in FIG. 4. Key assembly 80 includes a sensor system 82 for detecting which particular key 28 is being touched at any particular time and for providing a signal indicating same to processor 44. Preferably, key assembly 80 is a two stage system, wherein a first touch or press of a key 28 at a pressure that is less than some predetermined amount will result in the key indicating signal described above being sent to processor 44, and a second touch or press of the key 28 at a pressure that is greater than the predetermined amount will result in the function associated with the key being performed (e.g., the input of a particular letter or number associated with the key).

Referring to FIG. 4, each key assembly 80 includes a respective key 28 partially disposed within housing 8 of handheld electronic device 4. In particular, each key 28 is inserted through a respective hole 84 provided in housing 8 such that a top portion 86 of each key 28 extends outwardly from housing 8 and a bottom protruding portion 88 of each key 28 is disposed within housing 8.

In addition, the embodiment of key assembly 80 shown in FIG. 4 further includes a metal or carbon coated collapsible dome 90 that is connected at each end to first and second electrical traces 92 and 94, respectively, provided on handheld electronic device PCB 96. In addition, a central portion of collapsible dome 90 is disposed over a third electrical trace 98 provided on handheld electronic device PCB 96. As will be appreciated, when sufficient force (more than a certain predetermined level) is applied to key 28, it causes collapsible dome 90 to collapse such that the central portion of collapsible dome 90 comes into contact with electrical trace 98, thereby completing the circuit that comprises electrical traces 92, 94 and 98. When the circuit that comprises electrical traces 92, 94 and 98 is so completed, a signal corresponding to the function of key 28 is sent to processor 44.

As seen in FIG. 4, a strain gauge 100 is provided between bottom protruding portion 88 and collapsible dome 90, such as part of a laminate structure applied to the top surface of collapsible dome 90. Strain gauge 100 may take any of a number of known forms, such as, without limitation, a piezoelectric film piece. As is known in the art, piezoelectric film is a flexible, lightweight plastic, such as, without limitation, polyvinylidene fluoride (PVDF) and its copolymers, PVC or nylon, that generates an electrical voltage that is proportional to a force that is applied to it. Strain gauge 100 acts as a transducing element that converts mechanical energy (force) into electrical energy (voltage), and in particular converts the force applied thereto by protruding portion 88 resulting from pressure applied to key 28 by a finger or the like into a voltage signal. The strain gauge 100 is electrically connected (not shown) to the processor 44, and thus can be used to generate the signal (described above) that indicates which particular key 28 is currently being pressed.

Figure 5:
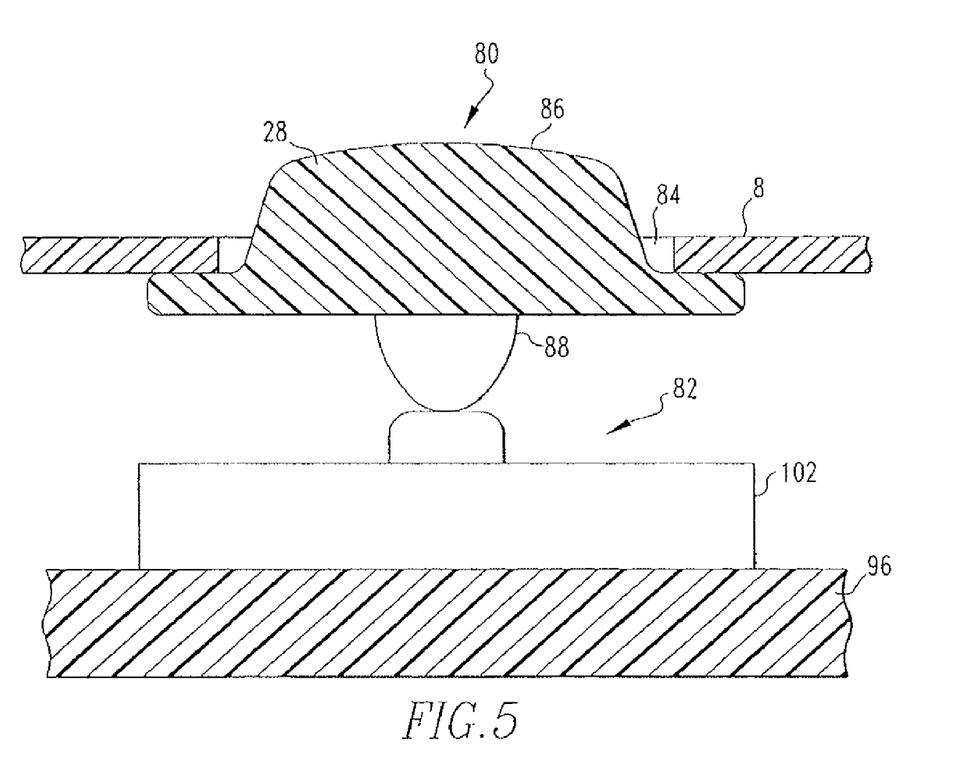
FIG. 5 is a schematic diagram of a second embodiment of a key assembly forming a part of the handheld electronic device shown in FIGS. 1-3.

As will also be appreciated, various lower level forces may be applied to key 28 shown in FIG. 4, each of which will cause collapsible dome 90 to partially, rather than completely, collapse (this is often referred to as an intermediate press of key 28). In a partially collapsed condition, the central portion of collapsible dome 90 will not come into contact with electrical trace 98, and thus the circuit that comprises electrical traces 92, 94 and 98 will not be completed. The force that is applied to key 28 in such situations will, however, exert a force on strain gauge 100, thereby generating a voltage signal that is sent to processor 44. As a result, the strain gauge 100 in cooperation with the key 28 and collapsible dome 90 implement a two stage sensor system as described above. As will be appreciated by those of skill in the art, alternative components may be used to implement a sensor system 82. For example, as shown in FIG. 5, a double action switch 102 may be substituted for collapsible dome 90 and strain gauge 100 to provide a two stage sensing system in which a first touch or press will generate a first signal (indicative of which key 28 is being pressed), and a second, harder press will generate a second signal (which initiates the function associated with the key 28). Any suitable known double action switch may be used for double action switch 102, a number of which are described in, for example, U.S. Pat. Nos. 6,303,887 and 6,809,272, the disclosures of which are incorporated herein by reference. In addition, other parts of input apparatus 16, such as thumbwheel 32, <ESCAPE> key 36, and telephone key 40, may similarly be provided with an assembly similar to key assembly 80 that includes a sensor system 82 for generating a signal indicating that part of input apparatus 16 is being pressed.

Thus, in operation, a navigational or other input from the input apparatus 16, e.g., an intermediate press of a key 28, will result in a signal being sent to the processor 44 that enables the processor 44 to identify the particular part of input apparatus 16, e.g., the particular key 28, that is being touched. The processor 44 then accesses the memory 48 to retrieve the sound tag 50 that corresponds with the particular part of input apparatus 16, e.g., the particular key 28. For example, an intermediate touch of the "5" key will result in the processor 44 retrieving the sound tag 50 that corresponds to the "5" key, which sound tag preferably is representative of the spoken word "five." The processor 44 then provides this retrieved sound tag 50 in the form of a sequence of digital values 64 (FIG. 3) to the digital-to-analog converter 52 which converts this sequence into a time-varying analog signal 68. The digital-to-analog converter 52 then provides the time-varying analog signal 68, which corresponds with a spoken word (e.g., "five"), to the amplifier 56. The amplifier 56 then provides an amplified analog signal 72 to the audible output transducer 60 which outputs an audible sound representative of the spoken word. The amplifier 56 may have an adjustable gain (not expressly depicted) that is set by the processor 44. The audible output transducer 60 can be any of an internal speaker, a separate loudspeaker, a headset speaker, or any other such device. Depending upon the nature of the audio output transducer 60, the gain of the amplifier 56 preferably is accordingly adjusted by the processor 44.

As is known, some handheld electronic devices have keyboards that have keys having multiple characters or symbols assigned thereto. For example, a cellular telephone typically has a keyboard having keys having letters and numbers assigned thereto. Similarly, some handheld electronic devices have unconventional keyboards, such as a reduced QWERTY keyboard. Thus, according to a further aspect of the invention, keys 28 having multiple characters or symbols assigned thereto may have multiple corresponding sound tags 50, and one or more routines 54 may be provided in memory 48 that enable processor 44 to access different sound tags 50 depending on the current state of the handheld electronic device 4, such as the application that is currently active. For example, in a handheld electronic device 4 having a phone and an email application, the routines 54 may be adapted to cause numeric sound tags to be accessed when the user is using the phone application, as alphabetic sound tags to be accessed when the user is using the email application. Alternatively, all of the multiple sound tags 50 corresponding to a key 28 may be accessed and subsequently converted into sound feedback when the key 28 is pressed to let the user know of the different options available with that key 28.

According to an alternative embodiment of the invention, graphics, preferably enlarged graphics, may be substituted for sound tags 50. In this embodiment, once the particular key 28 or other input element that is being touched is identified as described herein, the corresponding graphic may be accessed from memory 48 and may be displayed on display 12. As will be appreciated, the feedback in this form will be particularly useful for the visually impaired to identify the particular keys 28 or other input elements before completely depressing them (and initiating the associated function).

Thus, by providing feedback in the form of the spoken words or graphics that correspond to particular keys 28, handheld electronic device 4 according to the invention facilitates the performance of navigation and data input or entry functions. This feedback will be advantageous in situations where actually looking at handheld electronic device 4 is not desirable, such as in dangerous conditions like while driving, or not possible due to physical limitations of the user, such as a visual impairment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of facilitating the input of information in a handheld electronic device having a plurality of input elements, comprising:

receiving a signal indicating that a particular one of the input elements is being touched in a first manner, the particular one of the input elements having at least two characters or symbols assigned thereto;

providing a feedback signal comprising an audible sound that identifies a all of the characters or symbols of the particular one of the input elements after the signal is received; and performing a function associated with the particular one of the input elements when the particular one of the input elements is being touched in a second manner, the function being determined based on an application that is presently active on the handheld electronic device.

2. The method according to claim 1, wherein the audible sound comprises one or more spoken words of a digit, a symbol, or a function name associated with the particular one of the input elements.

3. The method according to claim 1, wherein the providing step further comprises accessing a particular stored sound tag representative of the audible sound and generating the audible sound using the particular stored sound tag.

4. The method according to claim 1, wherein the providing step comprises displaying a graphic on a display of the handheld electronic device that identifies the character or symbol of the particular one of the input elements.

5. The method according to claim 1, wherein the first manner comprises touching the particular one of the input elements with a first pressure, and wherein the second manner comprises touching the particular one of the input elements with a second pressure, the second pressure being greater than the first pressure.

6. The method according to claim 1, wherein the plurality of input elements comprise a plurality of keys.

7. A handheld electronic device, comprising:
an input apparatus having a plurality of input elements;
a processor; and
a memory in electronic communication with the processor, the memory storing one or more routines executable by the processor, the one or more routines being adapted to:
receive a signal indicating that a particular one of the input elements is being touched in a first manner, the particular one of the input elements having at least two characters or symbols assigned thereto;
provide a feedback signal comprising an audible sound that identifies a all of the characters or symbols of the particular one of the input elements after the signal is received; and
perform a function associated with the particular one of the input elements when the particular one of the input elements is being touched in a second manner, the function being determined based on an application that is presently active on the handheld electronic device.

8. The handheld electronic device according to claim 7, wherein the particular one of input elements comprises a key forming a part of a key assembly, the key assembly having a sensor system, the sensor system being in electronic communication with the processor, the sensor system generating and communicating to the processor the signal when the key is touched in the first manner.

9. The handheld electronic device according to claim 8, wherein the sensor system includes a strain gauge, the signal comprising a voltage signal generated by the strain gauge in response to a first pressure exerted on the strain gauge by the key, the first manner comprising touching the key with the first pressure.

10. The handheld electronic device according to claim 9, wherein the sensor system further includes a collapsible dome, the strain gauge being located between the key and the collapsible dome, the collapsible dome being fully collapsed in response to at least a second pressure being exerted on the collapsible dome by the key, the first pressure being less than the at least a second pressure, the second manner comprising touching the key with the at least a second pressure, the function being performed when the collapsible dome is fully collapsed.

11. The handheld electronic device according to claim 9, the strain gauge comprising a piece of piezoelectric film.

12. The handheld electronic device according to claim 8, wherein the sensor system includes a double action switch, the signal being generated in response to a first pressure exerted on the double action switch by the key, the first manner comprising touching the key with the first pressure.

13. The handheld electronic device according to claim 12, the function being performed when at least a second pressure is exerted on the double action switch by the key, the first pressure being less than the at least a second pressure, the second manner comprising touching the key with the at least a second pressure.

14. The handheld electronic device according to claim 7, wherein the audible sound comprises one or more spoken words of a digit, a symbol, or a function name associated with the particular one of the input elements.

15. The handheld electronic device according to claim 14, wherein the memory stores a plurality of stored sound tags, and wherein the one or more routines are further adapted to access a particular stored sound tag representative of the audible sound, the audible sound being generated using the particular stored sound tag.

16. The handheld electronic device according to claim 7, wherein the one or more routines are further adapted to provide the feedback by displaying a graphic on the display that identifies the particular one of the input elements.

* * * * *

UNITED STATES PATENT AND TRADEMARK OFFICE
CERTIFICATE OF CORRECTION

| | |
|---|---|
| PATENT NO. | : 8,259,071 B2 |
| APPLICATION NO. | : 12/868923 |
| DATED | : September 4, 2012 |
| INVENTOR(S) | : Jason T. Griffin |

Page 1 of 1

It is certified that error appears in the above-identified patent and that said Letters Patent is hereby corrected as shown below:

In the claims

At column 6, line 48, in claim 1, "that identifies a all" should read --that identifies all--.

At column 7, line 19, in claim 7, "that identifies a all" should read --that identifies all--.

Signed and Sealed this
Twentieth Day of May, 2014

Michelle K. Lee
*Deputy Director of the United States Patent and Trademark Office*